United States Patent [19]

Budnik

[11] Patent Number: 5,778,307
[45] Date of Patent: Jul. 7, 1998

[54] AMPLIFIER WITH ADAPTIVE OUTPUT ALLOCATION AND METHOD THEREOF

[75] Inventor: Brian J. Budnik, Watauga, Tex.

[73] Assignee: Motorola, Inc., Schaumburg, Ill.

[21] Appl. No.: 625,502

[22] Filed: Mar. 29, 1996

[51] Int. Cl.$^6$ .................................................. H04B 1/02
[52] U.S. Cl. ........................... 455/103; 455/17; 455/126; 330/129; 330/124 R
[58] Field of Search .................................. 455/126, 127, 455/103, 59, 17, 49.1, 116, 500, 61, 522, 102; 330/129, 279, 295, 124 R

[56] References Cited

U.S. PATENT DOCUMENTS

| | | | |
|---|---|---|---|
| 5,302,914 | 4/1994 | Arntz et al. | 455/126 |
| 5,410,729 | 4/1995 | Kumagai et al. | 455/103 |
| 5,530,920 | 6/1996 | Takeda | 455/126 |

Primary Examiner—Reinhard J. Eisenzopf
Assistant Examiner—Doris To
Attorney, Agent, or Firm—Charles W. Bethards

[57] ABSTRACT

An amplifier with adaptive output capacity allocation (201) including a processor (203), coupled to a signal, for examining the signal to determine a first capacity requirement and a second capacity requirement, and an amplifier (213), coupled to the processor and the signal, for processing the signal in accordance with the first capacity requirement and the second capacity requirement to provide an output signal thus maximizing power out of the amplifier given incoming signal conditions. A corresponding method of dynamically allocating spectral power in a transmitter having a peak power capability for transmitting information on a plurality of subcarriers during a plurality of predetermined sequential frame periods includes sampling the information (503) corresponding to a frame period to obtain a subcarrier envelope amplitude corresponding to each of the plurality of subcarriers; summing these subcarrier envelope amplitudes (505) to obtain a total envelope amplitude; examining the total envelope amplitude (507) to identify a maximum total envelope amplitude; and setting for the frame period a gain (509) in the transmitter such that the maximum total envelope amplitude substantially produces the peak power capability.

12 Claims, 7 Drawing Sheets

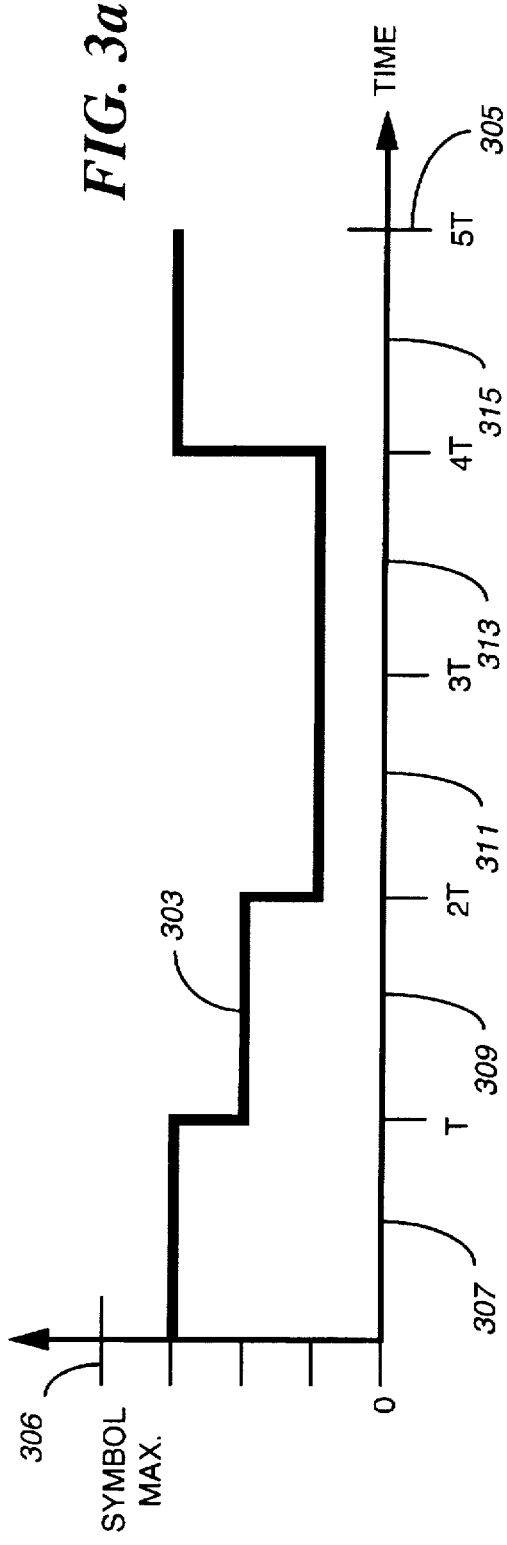
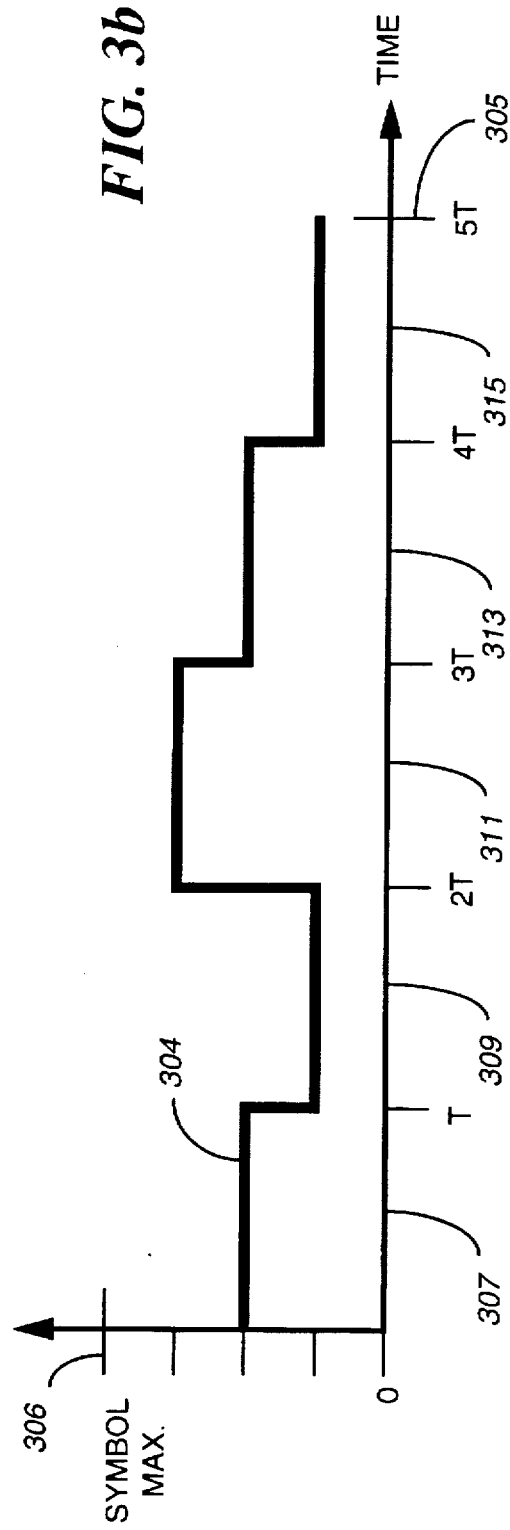

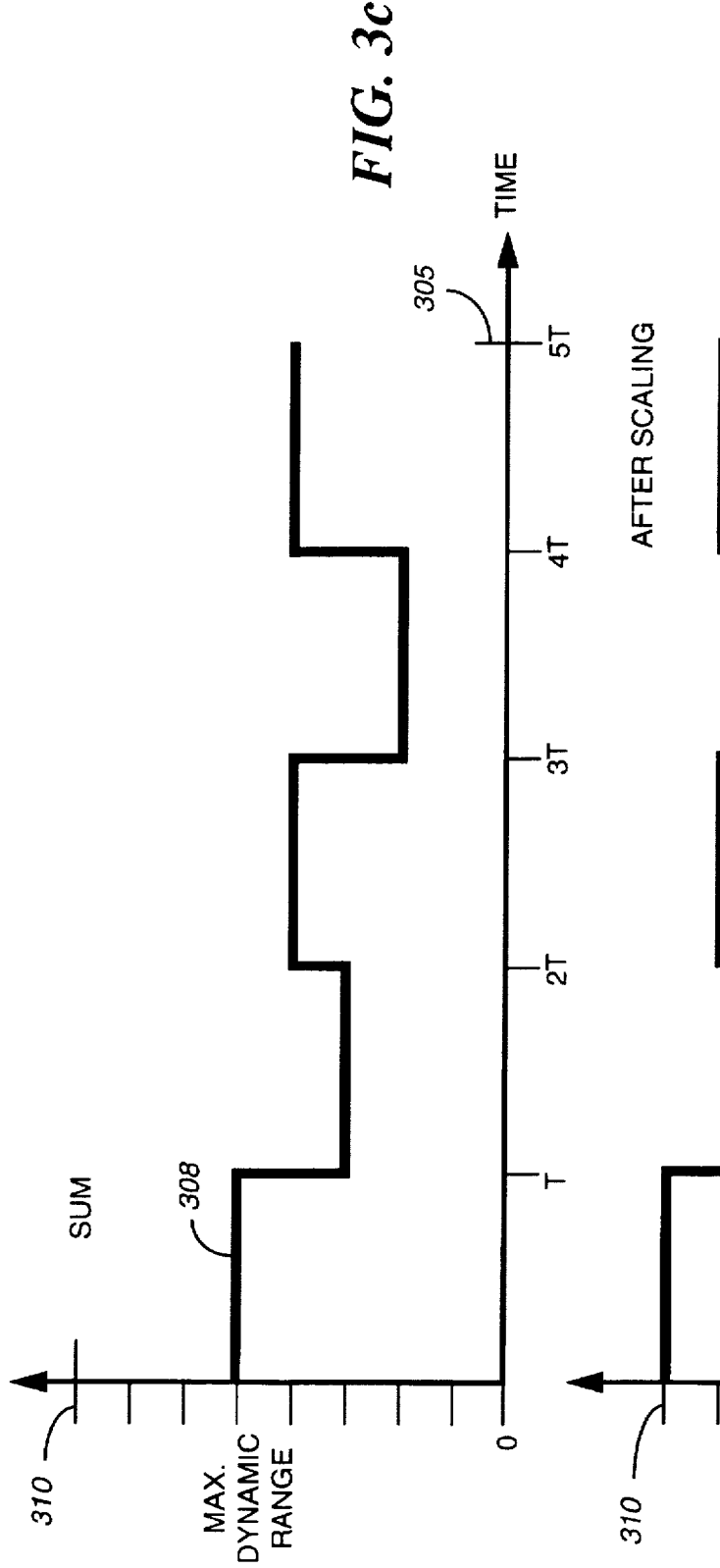
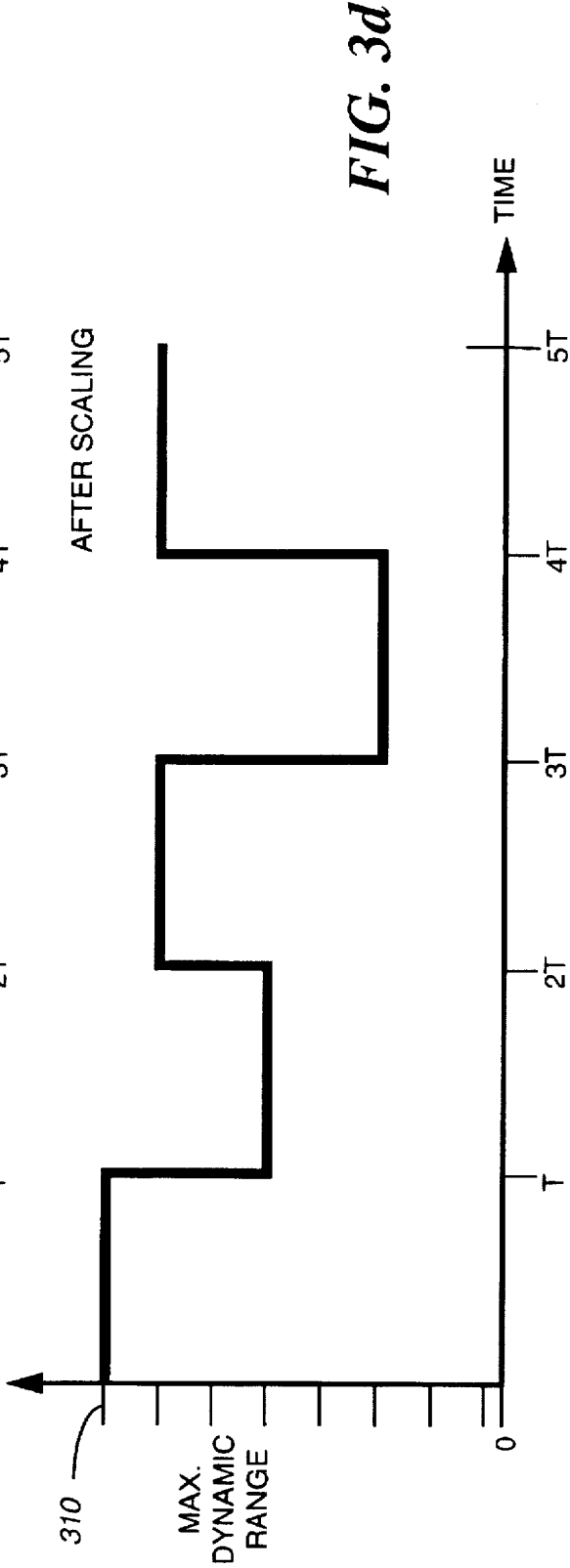

AMPLIFIER WITH ADAPTIVE OUTPUT ALLOCATION AND METHOD THEREOF

FIELD OF THE INVENTION

This disclosure deals with amplifiers and more specifically but not limited to amplifiers having adaptive output allocation and corresponding methods.

BACKGROUND OF THE INVENTION

Amplifiers are generally known and represent a basic building block for many electronic systems. As such practitioners continue to strive for improvements as well as deal with the limitations of existing amplifiers. Most if not all amplifiers have some output or capacity limitation, such as a maximum or minimum voltage level, power level, bandwidth or the like. Depending on the circumstances these output limitations can represent significant practical performance or design constraints.

For example, a linear amplifier such as a linear radio frequency (RF) power amplifier will be linear only so long as its power output remains below some maximum power output. This maximum power output will depend on the design limitations for the particular amplifier. The consequences of exceeding this limit are severe and include likely system performance degradation as well as exceeding interference or splatter limits for adjacent spectrum as mandated by the Federal Communications Commission.

As a result of these dire consequences, particularly for linear RF power amplifiers, practitioners have few if any alternatives other than designing for the absolute worst case or scaling back demands on and performance of the amplifier to the point that the absolute worst case will not exceed the capabilities of the amplifier. Depending on the relative difference between the worst case and typical case this may result in an amplifier or amplifier system that seems to be greatly over designed. For example, suppose a linear amplifier is required to amplify two different and uncorrelated signals each of amplitude A. This amplifier would need to be capable of peak output powers proportional to $4A^2$ in order to assure a power proportional to $A^2$ for each signal. This apparent over design will be reflected, for example, in additional economic burdens (costs) or physical size penalties for packaging and thermal management systems.

One way to resolve this problem is to design signaling protocols with smaller differences between worst case and typical or what is often called a peak to average ratio. To date this minimization of peak to average ratios while often helping has not eliminated the concerns and does nothing to address existing systems and protocols. Clearly a need exists for an amplifier with adaptive output allocation and the corresponding methods that may serve to minimize the required peak to average ratios.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

FIG. 3a through FIG. 3d are representative signal diagrams useful for appreciating certain functions within the FIG. 2 amplifier.

DETAILED DESCRIPTION OF A PREFERRED EMBODIMENT

Figure 1:
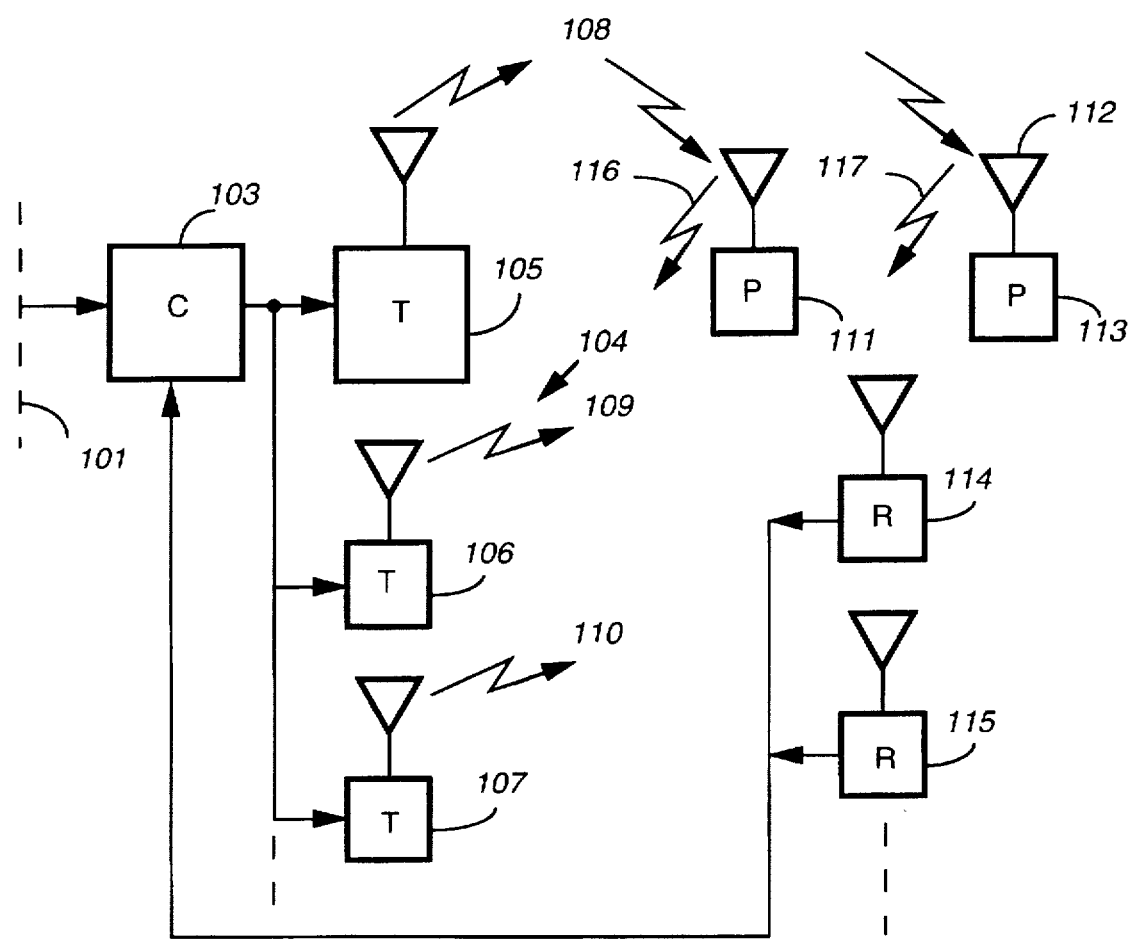
FIG. 1 is a block diagram of a wireless selective messaging system suitable for employing an embodiment of a selective message transmitter system in accordance with the instant invention.

The present disclosure deals with an amplifier having adaptive output capacity allocation or other functional blocks or systems, such as a selective message transmitter system with like allocation capability and various corresponding methods. The amplifier includes a processor that is coupled to a signal and arranged for examining the signal to determine a first capacity requirement and a second capacity requirement. Additionally included is an amplifier or like functional block coupled to the processor and the signal, the amplifier arranged and constructed to process the signal according to the first and the second capacity requirement to provide an output signal.

For example where the signal includes a first and a second amplitude varying subchannel or plurality of such subchannels the processor will examine the first and the second amplitude varying subchannel or each such subchannel over a time period, such as a symbol or frame, to determine the first and the second capacity requirement corresponding, for example and respectively, to a first and a second amplitude, such as peak or average amplitude, for this time period. Knowing the capacity requirements the first and the second amplitude varying subchannel are controlled, by for example scaling or varying either or both amplitudes to provide a composite amplitude that corresponds to the first and the second amplitude. The composite amplitude is then constrained or limited in some fashion, such as by attenuation or further magnification so that the amplifier substantially maximizes this output signal without exceeding some predetermined output level driven, for example, by linearity or dissipation constraints.

In a preferred form the amplifier with adaptive output capacity allocation algebraically adds or sums the first and the second amplitude varying subchannel and scales the result to provide the composite amplitude. Alternatively or additionally the amplifier will phase adjust the first and the second amplitude varying subchannel to increase an average value for the composite amplitude. Alternatively, where, for example, maximum coverage is desired, for one of the subchannels all others are temporarily disabled.

Where the amplifier defined above is a radio transmitter that has a peak power capability for transmitting information on a plurality of subcarriers during a plurality of predetermined sequential frame periods a preferred method of dynamically allocating spectral power from the radio transmitter includes the following steps. Initially, sampling the information corresponding to a frame period to obtain a subcarrier envelope amplitude corresponding to each of the plurality of subcarriers. Then summing the subcarrier envelope amplitude corresponding to each of the plurality of subcarriers, over the plurality of subcarriers to obtain a total envelope amplitude. Examining this total envelope amplitude to identify a maximum total envelope amplitude for the frame period and then setting for the frame period a gain in the radio transmitter such that the maximum total envelope amplitude substantially produces the peak power capability.

This method is further enhanced where the information is transmitted at a predetermined envelope amplitude and when only a first portion of the subcarriers have information to be transmitted during the frame period. Under these circumstances the sampling step further includes or becomes a step of obtaining a subcarrier envelope amplitude equal to the predetermined envelope amplitude for the first portion of the subcarriers having information to be transmitted, and a step of obtaining a zero subcarrier envelope amplitude for a second portion of the subcarriers not having information to be transmitted. Then the summing step is equivalent to the step of multiplying the predetermined envelope amplitude by a count of the portion of the subcarriers having information to be transmitted during the frame period, to obtain a single total envelope amplitude equivalent to the maximum total envelope amplitude.

The method is further embellished where a portion of the information is transmitted utilizing a variable envelope amplitude. Here the sampling step comprises a step of sampling the information at a plurality of predetermined sampling intervals to obtain a plurality of subcarrier envelope amplitudes corresponding to each of the plurality of subcarriers, and the summing step comprises a step of summing the plurality of subcarrier envelope amplitudes over the plurality of subcarriers to obtain a plurality of total envelope amplitudes. The examining step then includes a step of comparing the plurality of total envelope amplitudes to identify the maximum total envelope amplitude for the frame period.

An alternative embodiment in accordance with the instant invention is a selective message transmitter system with adaptive output capacity allocation that includes a processor coupled to a signal including a first and a second amplitude varying subchannel where the processor is responsive to a non-acknowledgment condition, for examining this first amplitude varying subchannel to determine a first capacity requirement, and an amplifier, coupled to the processor and the first amplitude varying subchannel, for processing this first amplitude varying subchannel in accordance with the first capacity requirement to provide an output signal.

The processor may examine the first amplitude varying subchannel over a time period to determine the first capacity requirement corresponding to a first amplitude for the time period and the selective message transmitter system then controls the first and the second amplitude varying subchannel to provide a composite amplitude corresponding to the first amplitude, where the composite amplitude is constrained such that the amplifier substantially maximizes the output signal. Such control may be accomplished by scaling or linearly varying the first amplitude varying subchannel provide this composite amplitude. During this action the second amplitude varying subchannel may be disabled thus concentrating or adaptively allocating all output capacity to the first subchannel.

Referring to the Figures a more detailed explanation of the instant disclosure will be provided. FIG. 1 depicts a selective messaging system (100) in overview block diagram format. The system includes a controller (103) coupled to a message source (101), such as the Public Switched Telephone Network. The controller (103) is coupled to a selective message transmitter system or base transmitters (105, 106, 107) and provides messages, such as paging messages, and control/scheduling information to this transmitter system. Each base transmitter uses the control scheduling information together with the messages to modulate a radio frequency carrier in accordance with the chosen modulation technique, such as preferably multiple subchannels where at least some subchannels include an amplitude modulation component and transmits the messages from an antenna, as a modulated radio frequency carrier, over their respective wireless channels (108, 109, 110) to the selective messaging units (111, 113), such as paging message units (PMU) via their respective antennas. While the two PMUs are shown it is understood that a plurality of such units may exist in actual systems and that each base transmitter will be capable of delivering messages to many such PMUs.

The above description applies to so called one way selective messaging systems where messages are delivered from the base transmitters to the PMUs. In two way systems where messages may originate at the PMUs either volitional or responsive to a message from the base transmitter the messaging system will additionally require receivers (114, 115). In such systems the PMUs, such as (111, 113) transmit a message, such as an acknowledgment (ACK) message from their respective antennas over their respective uplink wireless channels (116, 117) to one or more receivers (114, 115). The receivers are coupled to the controller (103) as depicted and allow the controller (103) to provide the appropriate base transmitter with a non-acknowledgment (NACK) signal under suitable circumstances, such as exceeding a time lapse without an ACK.

Figure 4A:
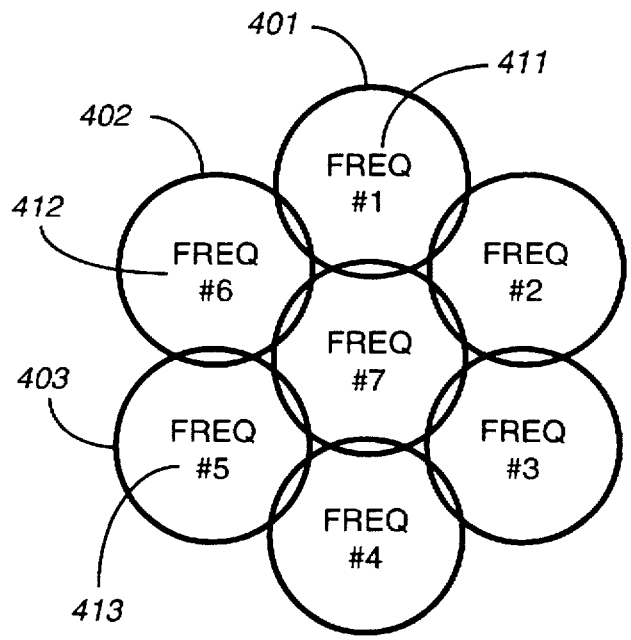
FIG. 4a and 4b are exemplary signal coverage diagrams useful for explaining the effects of the operation of the FIG. 1 system in accordance with an embodiment of the instant invention.
Figure 4B:
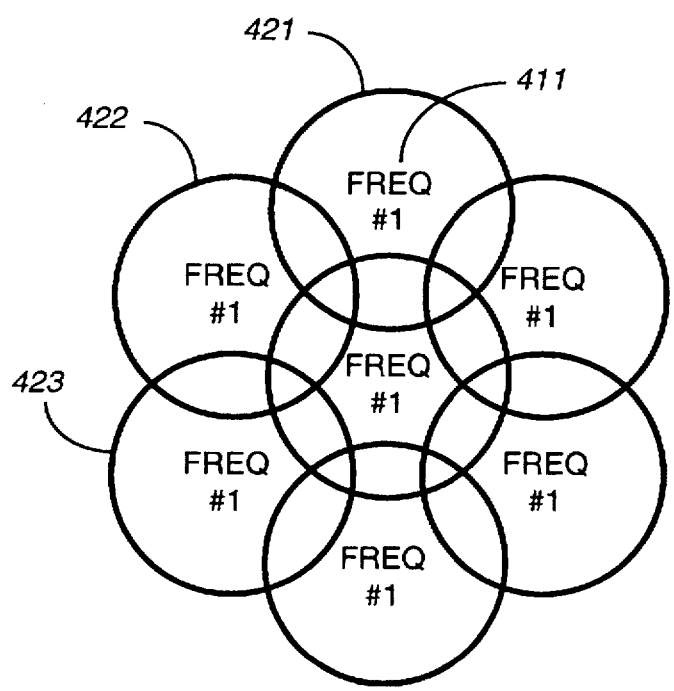

It is noted that the selective messaging system (100) as depicted is merely an exemplary setting for the instant disclosure and serves to facilitate disclosure and in no way is intended to limit the true spirit and scope of the present invention. Actual systems may include significant additional base transmitters, PMUs receivers and likely include an overlaying, perhaps satellite based system for maintaining a common time reference at each base transmitter for facilitating such functions as simulcasting a message from multiple base transmitters. The wireless channels (108, 109, 110) or uplink wireless channels (116, 117) may be the same or different radio frequencies depending on the system design, or immediate objective. FIG. 4a depicts in exemplary form a situation where each base transmitter operates at a power level thus providing coverage within a largely non overlapping border such as (401, 402, ... ). Additionally FIG. 4a shows a wireless channel having a different radio frequency, such as freq 1, freq 6, freq 5 (411, 412, 413) for each respective coverage area. FIG. 4a corresponds, for example, to the FIG. 1 system operating to deliver messages in a targeted delivery mode. In contrast FIG. 4b depicts larger coverage areas (421, 422, 423) with all areas operating on the same frequency, freq 1 (411). This corresponds to FIG. 1 system operating at higher effective power levels and if need be in a simulcast mode to insure that a PMU gets a message. One way and two way messaging systems have been documented by and are available from Motorola and other manufacturers.

Figure 2:
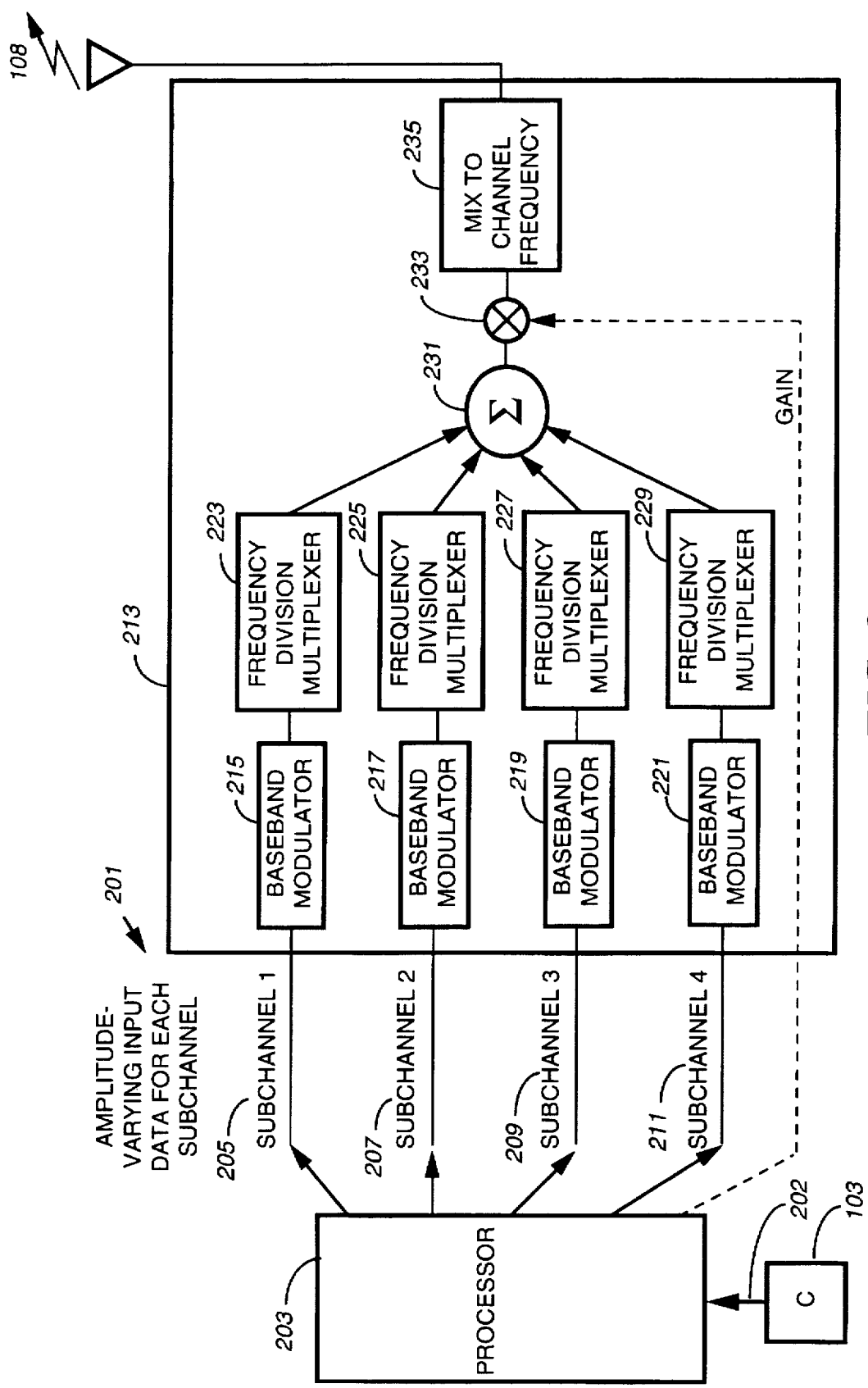
FIG. 2 is a block diagram of a preferred embodiment of an amplifier or transmitter suitable for use in the FIG. 1 messaging system.

Referring to the block diagram of FIG. 2 where like reference numerals refer to like elements from FIG. 1 the basic functional blocks of an amplifier or selective message transmitter having adaptive output capacity allocation (201) such as base transmitter (105), are depicted. Generally a signal including messages, control and scheduling information are coupled from the controller (103) to a processor (203) at input (202). This signal, specifically the messages are in the form of a plurality of amplitude varying subchannels (205, 207, 209, 211) or are broken down and arranged into a plurality of such subchannels by the processor and these subchannels are then coupled from the processor to an amplifier (213).

As an overview the processor examines the signal, preferably each of the subchannels, to determine a plurality of capacity requirements, preferably a capacity requirement for each subchannel. The amplifier (213) then processes the signal, specifically various of the amplitude varying subchannels in accordance with these capacity requirements to provide an output signal on the wireless channel (108).

For a better understanding we now refer to FIGS. 3a through 3d and the respective depictions of representative signals that may be observed on a first and a second amplitude varying subchannel. This discussion may be extended by analogy to additional signals or more complex circumstances. FIG. 3a shows an amplitude varying subchannel, specifically the signal or subcarrier envelope amplitude (303), on such a subchannel over a time period (305) including five sequential frame periods (307, 309, 311, 313, 315). Further the maximum expected value (306) for this subcarrier envelope amplitude is depicted as four units, while the actual or observed amplitude varies over the time period from 3 units to one unit. This observed amplitude is one example of the capacity requirement for this time period for this subchannel noted above.

FIG. 3b depicts a second amplitude varying subchannel, specifically the subcarrier envelope amplitude (304) over this same time period (305). Again we have the same maximum expected value (306) for this amplitude and an observed amplitude or envelope amplitude varying from a high of 3 units to a low of 1 unit. FIG. 3c depicts a total amplitude or total envelope amplitude (308) obtained by summing or algebraically adding envelope amplitude (303) and envelope amplitude (304) together. From FIG. 3c we observe that an expected maximum total value (310) is 8 units while the actual or observed total envelope amplitude varies from 5 units to a low of 3 units with an average of 3⅓ units over the time period (305).

FIG. 3d depicts the results of scaling the total envelope amplitude of FIG. 3c to provide a composite amplitude substantially equal to the expected maximum value (310) of 8 units. In practice this may be accomplished by having the processor or amplifier control the amplitude varying subchannels or gains of the subchannels or setting a gain in the transmitter for the time period or frame period such that the composite amplitude is constrained and results in the amplifier (213) producing its peak or maximum output signal or power. By observation had the subchannels depicted in FIG. 3a and 3b been phase aligned differently such that the maximum observed amplitudes of 3 units for each occurred at the same time the composite amplitude would have a maximum value of 6 units and very likely a wider range of observed values.

Analogously if the subchannels are properly phase aligned or phase adjusted the average value of the composite amplitude, thus average output signal or power level, may be increased yielding a greater coverage area for the relevant time period. It is further noted that if maximum coverage area is the objective it may be accomplished by temporarily disabling one of the subchannels and allocating all available output capacity to the remaining subchannel(s).

Returning to FIG. 2 the subchannels, preferably four, are coupled to respective baseband modulators (215, 217, 219, 221) where the subchannel signals are baseband modulated. These baseband modulators are then coupled, respectively, to frequency division multiplexers (223, 225, 227, 229) for subsequent frequency division multiplexing to provide respective multiplexed signals. These multiplexed signals are then summed together by signal summer (231) to provide a composite baseband carrier to variable gain block (233). This baseband carrier is scaled by gain block (233) to provide a scaled baseband signal to a mixer (235) where the baseband carrier frequency is translated to the wireless channel (108) operating frequency, such as freq 1.

With multiple amplitude varying subchannels the amplifier (213) must be a linear amplifier and must be linear up to a peak power capability $N^2$ times greater than that required for one subchannel where N is the number of subchannels and all subchannels are assumed to have equal maximum amplitude signals that may occur synchronously. For example in the preferred embodiment with four subchannels, if the system designer wishes to have 25 watts for each subchannel a linear amplifier capable of four hundred watts peak power must be designed. For various practical reasons given the state of the art such linear amplifiers with this wide peak to average ratio may be difficult or economically impractical to construct. Thus the inventive principles disclosed herein provide a significant advantage for practitioners faced with designing a system based on multiple subchannels.

Physically the preferred embodiment of the instant invention utilized an MCM68300 series microprocessor acting as the processor together with one or more MCM56000 series digital signal processors performing much of the baseband modulation and frequency division multiplexing, summing, scaling, and mixing functions. This is followed by a linear radio frequency amplifier fashioned from Motorola RF power devices such as available in RF Orchestra™ base transmitters available from Motorola. The microprocessor and digital signal processor is running software readily designed and developed by one of ordinary skill in the art.

Figure 5:
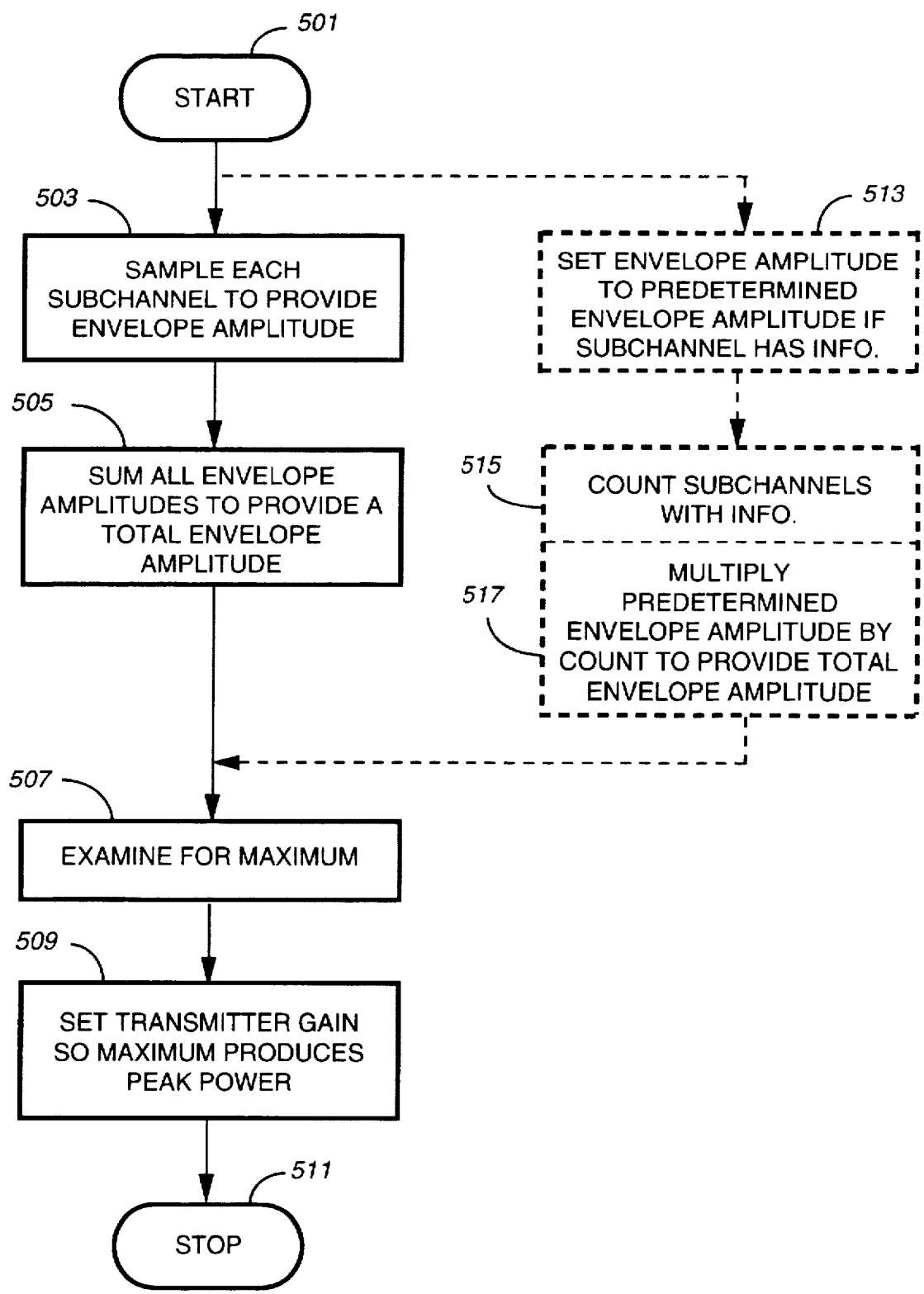
FIG. 5 is a flow chart of a preferred method in accordance with the instant invention of dynamically allocating spectral power from a radio transmitter.

In operation the amplifier with adaptive output capacity allocation of FIG. 2 may be further appreciated with reference to the process flow chart of FIG. 5. This flow chart depicts a method of dynamically allocating spectral power in a transmitter that has a peak power capability for transmitting information on a plurality of subcarriers during a plurality of predetermined sequential frame periods. The method starts at (501) by sampling at step (503) the information corresponding to a frame period to obtain a subcarrier envelope amplitude corresponding to each of the plurality of subcarriers. Then at step (505) summing the subcarrier envelope amplitudes over the plurality of subcarriers to obtain or provide a total envelope amplitude is undertaken. Next the process examines the total envelope amplitude to identify a maximum total envelope amplitude for the frame period at step (507). After that, at step (509), the process sets, for the frame period, a gain in the transmitter such that the maximum total envelope amplitude substantially produces the peak power capability and ends at (511).

An alternative method directed to similar results, but where the information is transmitted at a predetermined envelope amplitude and where only a first portion of the subcarriers have information to be transmitted during the frame period is depicted by steps (513–517). At step (513) the sampling step of (503) includes obtaining a subcarrier envelope amplitude equal to the predetermined envelope amplitude for the first portion of the subcarriers having information to be transmitted, and further (not specifically shown) includes a step of obtaining a zero subcarrier envelope amplitude for a second portion of the subcarriers not having information to be transmitted. Then step (515) counts the number of subcarriers or subchannels having information and summing step (505) is equivalent to the step (517) of multiplying the predetermined envelope amplitude by the count of the portion of the subcarriers having information to be transmitted during the frame period, to obtain a single total envelope amplitude equivalent to the maximum total envelope amplitude.

The process may be used where a portion of the information is transmitted utilizing a variable envelope amplitude. Then step (503) includes a step of sampling the information at a plurality of predetermined sampling intervals to obtain a plurality of subcarrier envelope amplitudes corresponding to each of the plurality of subcarriers, and step (505) includes a step of summing the plurality of subcarrier envelope amplitudes over the plurality of subcarriers to obtain a plurality of total envelope amplitudes. Step (507) includes a step of comparing the plurality of total envelope amplitudes to identify the maximum total envelope amplitude for the frame period.

Figure 6:
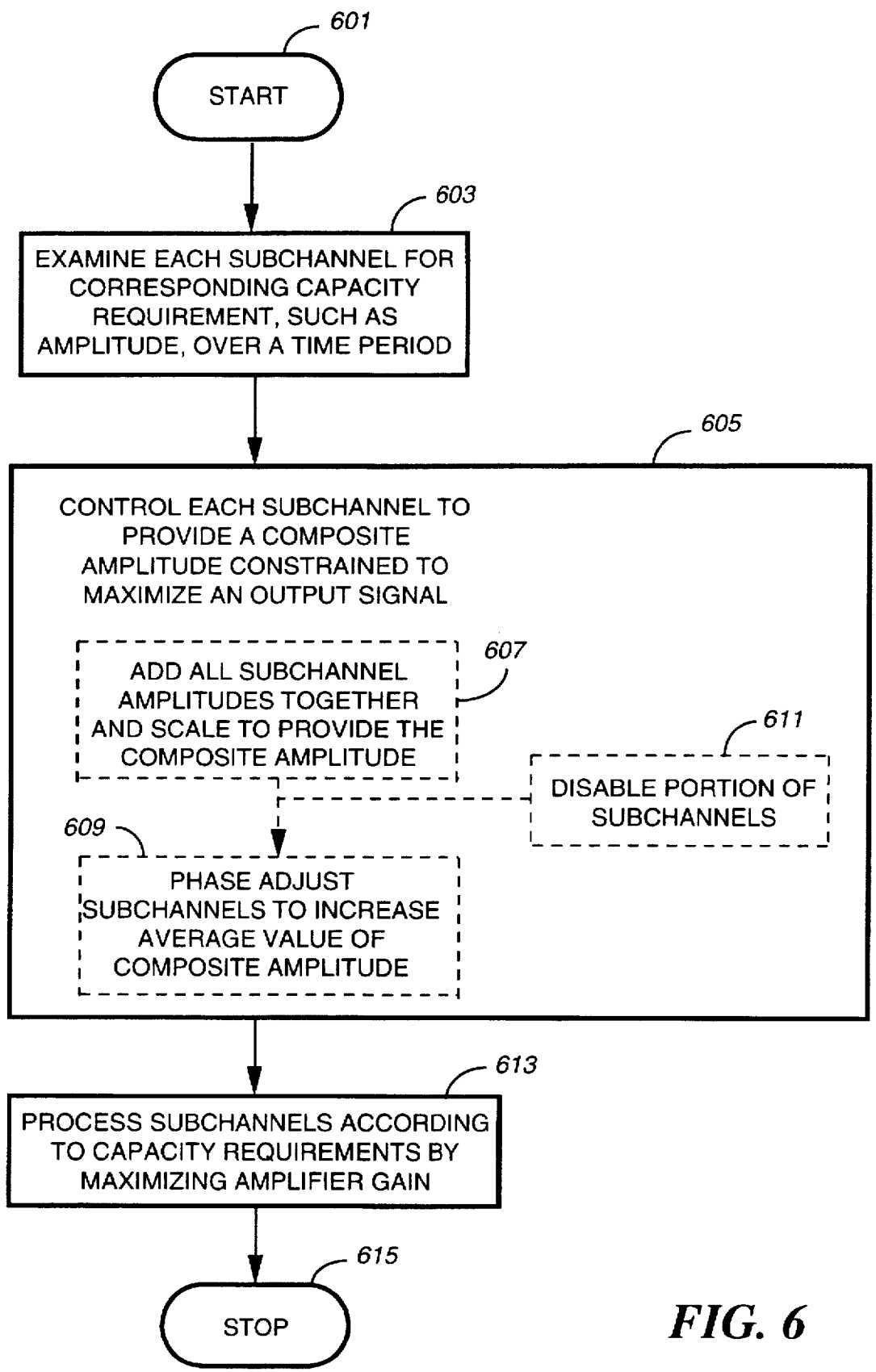
FIG. 6 is an alternative method of adaptively allocating output capacity for an amplifier.

An alternative method of adaptively allocating output capacity for an amplifier is depicted in the FIG. 6 process flow chart. This method begins at (601) and examines at step (603), via for example the processor (203), a signal, specifically each subchannel of the signal to determine a corresponding capacity requirement, such as an amplitude for a time period. At step (605) the various subchannels are controlled to provide a composite amplitude corresponding to amplitudes from step (603), the composite amplitude constrained to substantially maximize an output signal.

The control step may include algebraically adding all amplitudes together and scaling the result to obtain the composite amplitude depicted at step (607), or phase adjusting certain subchannel signals to increase the average value or decrease the peak value of the composite amplitude at step (609) or completely disabling a portion of the subchannels depicted as step (611). In any event at step (613) the signal, specifically subchannels are processed by for example amplifier (213) according to the capacity requirements, specifically amplitudes as controlled, to provide the output signal and the process ends at (615).

A particularly suitable application of the inventive principles disclosed here is where a message delivery is reattempted, responsive for example to a non acknowledgment condition. A selective message transmitter system with adaptive output capacity allocation may be defined to include a processor coupled to a signal including a first and a second amplitude varying subchannel. The processor is responsive to a non-acknowledgment condition at (202). For example a message delivery to a particular subscriber was previously attempted and a period of time has lapsed without an ACK. The system thus needs to reattempt delivery and the processor examines the first amplitude varying subchannel to determine a first capacity requirement, such as that subchannel amplitude for a time period. The various subchannels are then controlled by, for example, disabling them and scaling the amplitude of the desired subchannel to insure a maximum output signal or power and the amplifier processes or amplifies and transmits the desired subchannel in accordance with its capacity requirements at or near maximum power out, thus providing the greatest possible coverage area from that transmitter. The likelihood that the subscriber will be contacted will be further increased if numerous transmitters are operated in a simulcast mode according to this disclosure.

It will be appreciated by those of ordinary skill in the art that the apparatus and methods disclosed provide various approaches for allocating an amplifier or transmitters output capacity without compromising any amplifier characteristics or otherwise unnecessarily burdening processing resources. These inventive structures and methods may be readily and advantageously employed in a wireless selective messaging system, paging transmitter or other communications amplifier or system to provide an amplifier with adaptive output allocation or a corresponding method of dynamically allocating power output. Hence, the present invention, in furtherance of satisfying a long-felt need of wireless communications, readily facilitates, for example, transmitters or amplifiers for linear modulation systems by providing techniques and apparatus for signal processing, which amplifiers and the like may now operate with reduced linear dynamic range or alternatively greater performance from a given dynamic range.

It will be apparent to those skilled in the art that the disclosed invention may be modified in numerous ways and may assume many embodiments other than the preferred forms specifically set out and described above. For example many of the inventive procedures may equally be performed by the controller (103) or controller in conjunction with the processor (203) and amplifier (213). Accordingly, it is intended by the appended claims to cover all modifications of the invention which fall within the true spirit and scope of the invention.

What is claimed is:

1. An amplifier with adaptive output capacity allocation, the amplifier comprising in combination;

a processor, coupled to a signal, for examining said signal to determine a first capacity requirement and a second capacity requirement, said signal including a first and a second amplitude varying subchannel and said processor examining said first and said second amplitude varying subchannel over a time period to determine said first and said second capacity requirement corresponding, respective to a first and a second amplitude for said time period and an amplifier, coupled to said processor and said signal, for processing said signal in accordance with said first capacity requirement and said second capacity requirement to provide an output signal, said first and said second amplitude varying subchannel are controlled to provide a composite amplitude corresponding to said first and said second amplitude, said composite amplitude constrained such that said amplifier substantially maximizes said output signal.

2. The amplifier of claim 1 wherein said first and said second amplitude varying subchannel are algebraically added and scaled to provide said composite amplitude.

3. The amplifier of claim 2 wherein said first and said second amplitude varying subchannel are phase adjusted to increase an average value for said composite amplitude.

4. The amplifier of claim 2 wherein said second amplitude varying subchannel is disabled.

5. A method of dynamically allocating spectral power in a transmitter having a peak power capability for transmitting information on a plurality of subcarriers during a plurality of predetermined sequential frame periods, the method comprising the steps of:

sampling the information corresponding to a frame period to obtain a subcarrier envelope amplitude corresponding to each of the plurality of subcarriers;

summing said subcarrier envelope amplitude corresponding to each of the plurality of subcarriers, over the plurality of subcarriers to obtain a total envelope amplitude;

examining said total envelope amplitude to identify a maximum total envelope amplitude for the frame period; and setting for the frame period a gain in the transmitter such that said maximum total envelope amplitude substantially produces said peak power capability.

6. The method of claim 5, wherein the information is transmitted at a predetermined envelope amplitude, and wherein only a first portion of the subcarriers have information to be transmitted during the frame period, and wherein the sampling step comprises a step of obtaining a subcarrier envelope amplitude equal to the predetermined envelope amplitude for the first portion of the subcarriers having information to be transmitted, and further comprises a step of obtaining a zero subcarrier envelope amplitude for a second portion of the subcarriers not having information to be transmitted, and wherein the summing step is equivalent to the step of multiplying the predetermined envelope amplitude by a count of the portion of the subcarriers having information to be transmitted during the frame period, to obtain a single total envelope amplitude equivalent to the maximum total envelope amplitude.

7. The method of claim 5, wherein a portion of the information is transmitted utilizing a variable envelope amplitude, and wherein the sampling step comprises a step of sampling the information at a plurality of predetermined sampling intervals to obtain a plurality of subcarrier envelope amplitudes corresponding to each of the plurality of subcarriers, and wherein the summing step comprises a step of summing the plurality of subcarrier envelope amplitudes over the plurality of subcarriers to obtain a plurality of total envelope amplitudes, wherein the examining step comprises a step of comparing the plurality of total envelope amplitudes to identify the maximum total envelope amplitude for the frame period.

8. The method of claim 5 further including a step of phase adjusting the information corresponding to a subcarrier to thereby increase an average value corresponding to the maximum total envelope amplitude.

9. The method of claim 5 further including a step of disabling a portion of the subcarriers prior to said step of sampling.

10. The method of claim 9 wherein said step of disabling is responsive to a non-acknowledgment signal corresponding to a desired subcarrier, said portion of the subcarriers excluding said desired subcarrier.

11. A selective message transmitter system with adaptive output capacity allocation, comprising in combination:

a processor coupled to a signal including a first and a second amplitude varying subchannel, said processor, responsive to a non-acknowledgment condition, for examining said first amplitude varying subchannel over a time period to determine a first capacity requirement corresponding to a first amplitude for said time period, and an amplifier, coupled to said processor and said first amplitude varying subchannel, for processing said first amplitude varying subchannel in accordance with said first capacity requirement to provide an output signal, said first amplitude varying subchannel being scaled to provide a composite amplitude corresponding to said first amplitude said composite amplitude constrained such that said amplifier substantially maximizes said output signal.

12. The selective message transmitter system of claim 10 wherein said second amplitude varying subchannel is disabled.

* * * * *